(No Model.) 2 Sheets—Sheet 1.
J. H. BULLARD.
BICYCLE BRAKE.
No. 581,654. Patented Apr. 27, 1897.
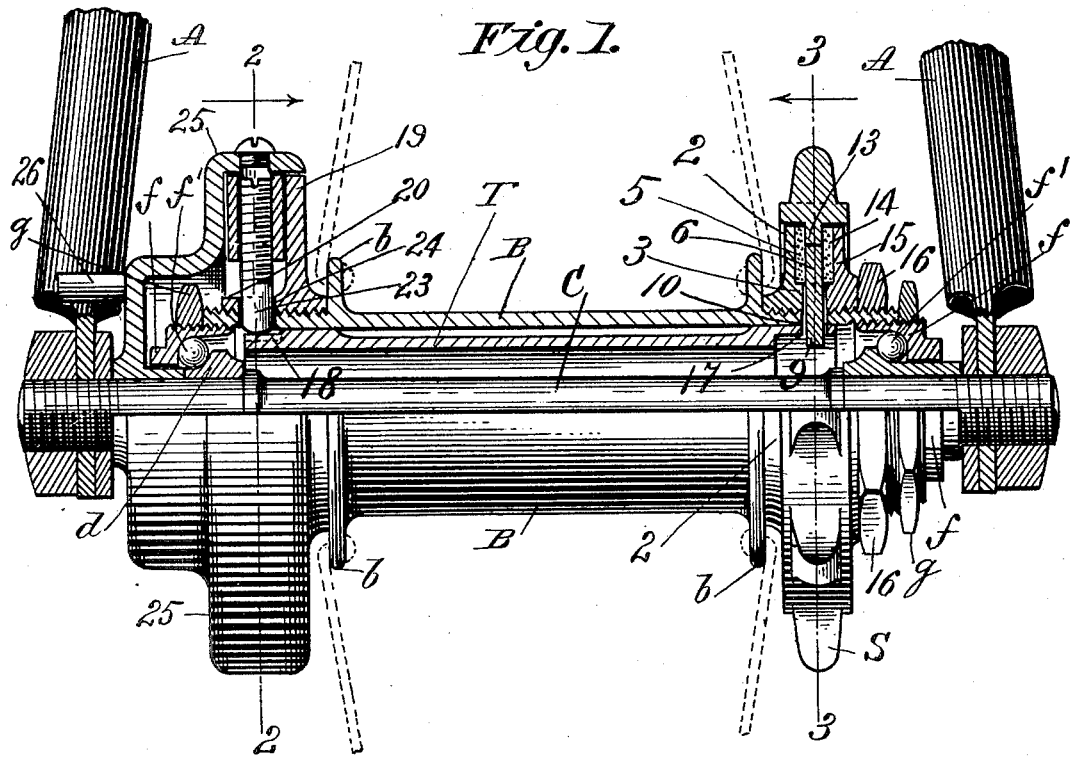
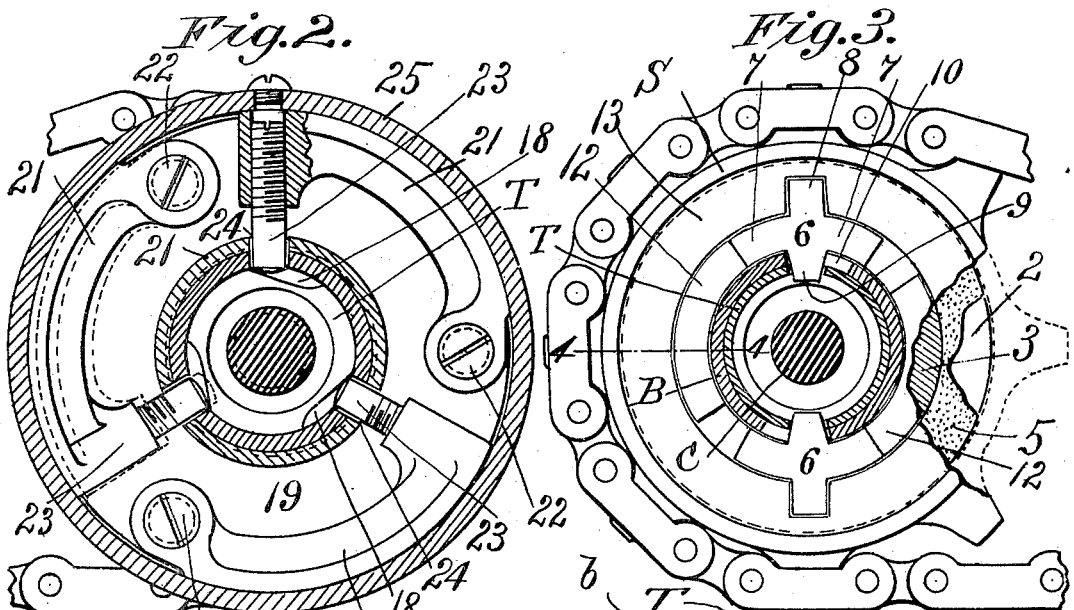
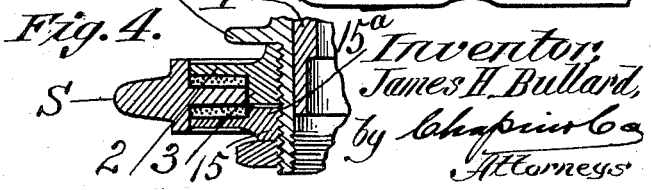
Witnesses:
Inventor:
James H. Bullard,
by Chapin & Co.
Attorneys

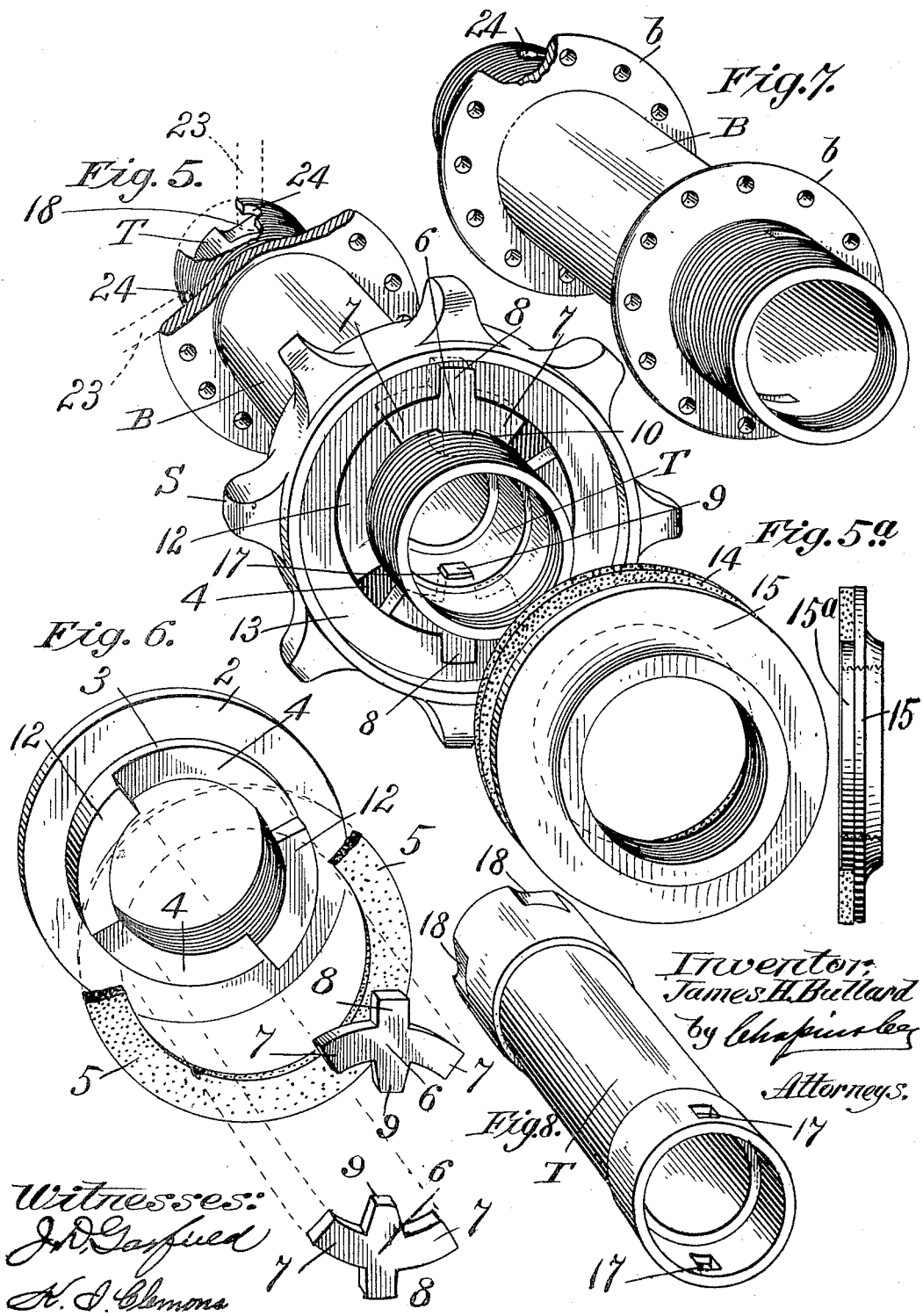

UNITED STATES PATENT OFFICE.

JAMES H. BULLARD, OF SPRINGFIELD, MASSACHUSETTS, ASSIGNOR OF ONE-HALF TO HENRY A. CHAPIN, OF SAME PLACE.

BICYCLE-BRAKE.

SPECIFICATION forming part of Letters Patent No. 581,654, dated April 27, 1897.

Application filed January 9, 1897. Serial No. 618,506. (No model.) Patented in Canada February 8, 1897, No. 54,916.

*To all whom it may concern:*

Be it known that I, JAMES H. BULLARD, a citizen of the United States of America, residing at Springfield, in the county of Hampden and State of Massachusetts, have invented new and useful Improvements in Brakes for Bicycles and Analogous Vehicles, of which the following is a specification, and for which I have received Letters Patent in Canada, dated February 8, 1897, No. 54,916.

This invention relates to bicycle-brakes, and particularly to that class of brakes applied to the rear wheel-hub of the vehicle and operated by the chain in the act of back-pedaling, the object of the invention being to produce a brake mechanism in which a limited rotational movement of the rear sprocket on its hub, under the restraint of an adjustable resistance, is made to operate several movable brake elements secured to and rotating with said hub in a plane at right angles to the axis of said hub against the interior surface of a stationary cup-shaped case inclosing said brake elements, which case is located near the end of the hub opposite the sprocket-wheel end thereof, the means of engagement between said sprocket-wheel and said brake elements being entirely inside of the said wheel-hub, all as hereinafter fully described.

In the drawings forming part of this specification, Figure 1 is a side elevation, partly in section, of a bicycle-hub having applied thereto a brake mechanism embodying my invention. Fig. 2 is a cross-section through the hub, taken on line 2 2, Fig. 1. Fig. 3 is a cross-section through the wheel-hub and the inner tube therein, taken on line 3 3, Fig. 1, a portion of the parts shown therein being broken away. Fig. 4 is a sectional view taken on line 4 4, Fig. 3. Fig. 5 is a perspective view of a wheel-hub, showing the manner of attaching the sprocket-wheel thereto and the location of certain parts inside of said hub and showing some of the sprocket-attaching parts separated from the hub. Fig. 5ª is a side elevation, partly in section, of said detached sprocket-attaching parts shown in Fig. 5. Fig. 6 is a perspective view of certain parts shown in Fig. 5, but herein separated from one another. Fig. 7 is a perspective view of a wheel-hub with all of the brake mechanism removed. Fig. 8 is a perspective view of a tube fitting inside of the hub shown in Fig. 7.

Referring to the drawings, A represents a portion of the frame of a bicycle.

B represents the hub-barrel, having the spoke-flanges $b\ b$ thereon.

C represents the axle, secured in said frame in the usual manner. $d\ d$ are ball-cones on said axle.

$f f$ are ball-cups screwed into the ends of the hub-barrel securing the balls $f'$ between the said cones and cups, and $g\ g$ check-nuts for said cups.

The above-mentioned parts constitute, minus the sprocket-wheel, the elements common to nearly all bicycle-hub constructions, with but few variations.

In applying my brake mechanism to a hub it is necessary that the sprocket-wheel should be secured thereon so that it can be rotated on said hub within certain prescribed limits and yet engage positively therewith for propelling the bicycle, and, furthermore, it is necessary that when said sprocket-wheel is rotated on said hub said limited rotation must take place against a controlled resistance; and to these ends said sprocket is applied to the hub as follows:

The exterior surface of one end of the hub-barrel B, from the spoke-flange outward, is screw-threaded. A disk 2 is then screwed up to a bearing against said spoke-flange. Fig. 6 shows said disk in perspective. Said disk is provided with a hub 3, and two oppositely-located segment-shaped parts 4 of said hub are cut away, not extending in depth quite to the surface of the disk. (See Fig. 6.) A friction-ring 5 is then placed over said hub closely against the face of said disk. This ring may be made of any suitable metal, preferably gun-metal or some similar composition. Two locking-pieces 6, (shown clearly in Figs. 3 and 5 and in perspective in Fig. 6,) having curved oppositely-extending arms 7 and oppositely-located projections 8 and 9, the radius of said curved arms being the same as the radius of the exterior diameters of the hub 3, are placed in the cut-away parts 4 of the hub 3, the projections 9 passing through slots 10, cut in said hub ends in a position at right angles to the axis thereof and located so that they will fall within the cut-away parts 4 of the hub 3. As shown in Figs. 3 and 5, said cut-away portions 4 exceed the total length of the locking-pieces 6 between the ends of the curved arms 7 thereof, and the length of the slots 10 in the hub-barrel B is such that when the pieces 6 are moved circumferentially around said hub the ends of the curved arms 7 will strike against the end of one of the parts 12 of the hub 3 between the cut-away portions 4 before the projection 9 will reach the end of the said slot 10. Said parts 12 further serve as a hub over which the sprocket-wheel fits and by which it is centered relative to the other parts of the device, the sectional view in Fig. 4 showing the relation of these parts. The difference between the length of the cut-away portions 4 of the hub 3 and the width of the locking-pieces 6 between the ends of the arms 7 determines the extent of rotation of said sprocket-wheel on its hub. The hub-barrel B is now ready for the sprocket-wheel S, which is made without any hub portion by which it is usually screwed onto the barrel B, but the web 13 thereof is turned smooth on both faces thereof and the central hole therethrough is of a diameter permitting it to fit easily over the outside of the hub 3. Cutaway portions for the reception of the projections 8 of the locking-pieces 6 are provided in said web 13, which projections extend beyond the circumference of said hub 3. By this construction the sprocket-wheel S can move in either direction on the said hub-barrel B until one end or the other of the arms 7 of the pieces 6 abuts against the portions 12 of the hub 3. A second friction-ring 14 is then fitted within the rim of the sprocket-wheel against the face of the web 13, and a disk 15 screwed up thereagainst, thus clamping the said web securely. By turning up said disk 15 more or less the web of the sprocket-wheel is clamped between it and the disk 2 with as much or as little force as may be desired, whereby a greater or less amount of force may be required to rotate said sprocket. Said disk 15 has a hub 15$^a$ turned thereon on its inner face, as shown, which fits the interior diameter of said ring 14, but said ring 14 projects slightly beyond the face of said hub, and the friction-ring 5 projects beyond the bottom of the cut-away portions 4 of the hub 3, whereby when said outer disk 15 is screwed up the clamping force thereof is exerted on said sprocket-web entirely through said friction-rings. A check-nut 16 is screwed up on the hub against the disk 15 to lock it in place.

In assembling the parts as above, after the disk 2 has been screwed onto the hub and before the locking-pieces 6 have been put in place the tube T is inserted in said hub-barrel B. This tube (shown in Fig. 8 in perspective and in part in some of the other figures) is made of steel and has a bearing in said hub-barrel only on each end thereof and turns freely therein. Through the end of said inner tube under the sprocket perforations 17 are made for the reception of the ends of the projections 9 of the locking-pieces 6, said projections being long enough to extend through both the hub-barrel and the said tube T and fit the said perforations 17 closely. Thus it is seen that the rotary movement of the sprocket-wheel on its hub will rotate said tube T in like degree within said hub-barrel.

In the exterior surface and near the end of the tube T opposite to the sprocket-wheel end are cam-depressions 18, arranged in the same circular path therearound. Said depressions, as shown in the end view of said tube in Fig. 2, are deepest at one end and incline gradually toward the surface of the tube.

A disk 19 is screwed on the outer end of the hub-barrel B up to a bearing against the spoke-flange $b$, said disk having a long hub 20 thereon to give it a rigid seat on said hub-barrel. On said disk, equidistant from each other and from the center of the hub, are three segment-shaped brake-shoes 21, constituting the rotating brake element and secured thereto by screws 22, passing through one end of said segments and on which the latter swing freely. The radius of the outer surface of said segments is equal to the radius of the disk 19 to which they are pivotally secured in such position that the outer surface of said segments, when the brake is set, will be in the position relative to said disk shown in Fig. 2. The opposite free ends of said brake-shoes have holes drilled through them, radially disposed as regards said disk, to which they are pivoted, said holes being tapped to fit the screws 23 closely. Said screws are headless, preferably, and their outer ends are sunk below the level of the brake-shoes, as shown in said Fig. 2. Holes 24 are drilled through the hub of the disk 19 and through the hub-barrel in such position as to lie directly over the cam-depressions 18 in the surface of the inner tube T, through which holes the ends of the screws 23 pass freely, the inner extremities of said screws resting in the deepest portions of the cam-depressions when the brake mechanism is not in operation. This last-named position of the brake-shoes is shown in Fig. 2 in dotted lines, only one of them being so indicated. The inner ends of said screws are slightly rounded and hardened, and the end of the tube T having cam-depressions 18 is also hardened.

All of the parts indicated in the above description rotate with the wheel-hub to which they are attached.

The fixed brake element against which the brake-shoes are moved into engagement to arrest the rotating hub consists of a cup-shaped case 25. This is made preferably of steel and has an internal diameter slightly larger than the diameter of disk 19 and fits over the latter, as shown in Fig. 1 in section, the brake-shoes attached to said disk being inclosed by said case 25, the outer surfaces of said shoes lying in close proximity to the inner surface of the rim of said case and parallel therewith. Said case is maintained in a position concentric with said hub parts by having a bearing on the axle C and is prevented from being rotated by the contact of the brake-shoes therewith by a pin 26, secured to said case and projecting therefrom, as shown in Fig. 1, to engage a part of the frame of the bicycle, or in any other convenient manner.

From the above description it is obvious that the rotary movement of the sprocket-wheel S relative to its hub-barrel B will rotate the inner tube T within said hub-barrel in like degree, and the rotation of the latter causes the movement of the inclined cam depressions against the ends of the screws 23, resting thereagainst, forcing outward against the interior of the case 25 the brake-shoes 21 and applying resistance to the rotation of said wheel-hub in proportion to the degree of back pressure applied to the sprocket by the act of back-pedaling; and, as stated above, the rotary movement of the sprocket on its hub being effected only against a certain resistance, it follows that to whatever degree said sprocket may be rotated it must remain in that position until an amount of force is applied to it to rotate it in the opposite direction equal to that required to move it in the first instance. This permits a rider to apply the brake as much as desired and then take the feet off from the pedals, if he so wishes, the brake meanwhile remaining set. Furthermore, the resistance applied to the sprocket-wheel being a controlled or adjustable resistance, it can be graduated to suit the strength of a child or adult, or made so great that it will be beyond the strength of the rider to move it, and the machine then would be in the same condition as though no brake mechanism were attached thereto.

It is obvious that it would come within the scope of this invention were a bevel-gear substituted for the sprocket-wheel on the rear hub and gear connections between it and the crank-axle substituted for the chain shown herein.

Having thus described my invention, what I claim, and desire to secure by Letters Patent, is—

1. A brake mechanism for bicycles comprising a wheel-hub, a sprocket-wheel engaging therewith and rotatable thereon, a brake element movable in a plane at right angles to said hub and supported thereon on the end thereof opposite to that on which said sprocket-wheel is secured and rotating therewith, a non-rotatable brake element concentric with said hub, and means within said hub between said sprocket-wheel and said non-rotatable brake element, and actuated by said sprocket-wheel, for effecting the engagement and disengagement of said rotating and non-rotating brake elements, and means for rotating the sprocket-wheel, substantially as described.

2. A brake mechanism for bicycles comprising a wheel-hub, a sprocket-wheel engaging therewith and rotatable thereon, means for applying to said sprocket-wheel an adjustable resistance, a brake element consisting of parts movable in a plane at right angles to the axis of said hub, and rotating therewith on the end thereof opposite to that on which said sprocket-wheel is secured, a non-rotatable brake element concentric with said hub, and means within the latter between said sprocket-wheel and said non-rotatable brake element, and actuated by said sprocket-wheel, for effecting the engagement and disengagement of said rotating and non-rotating brake elements, and means for rotating the sprocket-wheel, substantially as described.

3. A brake mechanism for bicycles comprising a wheel-hub, a sprocket-wheel engaging therewith and rotatable thereon, means for applying to said sprocket-wheel an adjustable resistance, a brake element consisting of parts movable in a plane at right angles to the axis of said hub, and pivotally secured thereto and rotating therewith on the end thereof opposite to that on which said sprocket-wheel is secured, a non-rotatable brake element concentric with said hub, and means within said hub and rotatable therein between said sprocket-wheel and said non-rotatable brake element, actuated by said sprocket-wheel for effecting the engagement and disengagement of said rotating and non-rotatable brake elements, and means for rotating the sprocket-wheel, substantially as described.

4. A brake mechanism for bicycles comprising a wheel-hub, a sprocket-wheel engaging therewith and rotatable thereon, means for applying to said sprocket-wheel an adjustable resistance, a brake element consisting of parts movable in a plane at right angles to the axis of said hub, pivotally secured thereto and rotating therewith, on the end thereof opposite to that on which said sprocket-wheel is secured, a non-rotatable brake element concentric with said hub, and means within said hub for actuating said movable parts consisting of a tube rotatable therein, and operatively engaging by one end said movable parts, and by its opposite end engaged by said sprocket-wheel, whereby it is actuated for effecting the engagement and disengagement of said rotating and non-rotating brake elements, and means for rotating said sprocket-wheel, substantially as described.

5. A brake mechanism for bicycles comprising a wheel-hub, a sprocket-wheel engaging said hub and rotatable thereon, means for applying an adjustable resistance to said sprocket-wheel, a rotating brake element consisting of parts attached to said hub, which are movable and adjustable in a plane at right angles to the axis thereof, a non-rotatable brake element and means within said hub, between said sprocket-wheel and said movable parts, and actuated by said sprocket-wheel for effecting the engagement and disengagement of said rotating and non-rotating brake elements, and means for rotating said sprocket-wheel, substantially as described.

6. A brake mechanism for bicycles comprising a wheel-hub, a sprocket-wheel engaging said hub and rotatable thereon, means for applying an adjustable resistance to said sprocket-wheel, a rotating brake element consisting of parts attached to said hub which are movable and adjustable in a plane at right angles to the axis thereof, a non-rotatable brake element and means within said hub for effecting the engagement and disengagement of said fixed brake element, and said movable parts, consisting of a tube, cam depressions in said tube with which said movable brake parts engage, and means of connection between said sprocket-wheel and said tube whereby the rotatory movements of the former actuate the latter, and means for rotating said sprocket-wheel, substantially as described.

7. In combination, a wheel-hub, a stationary disk on said hub, a sprocket-wheel carried on said hub in frictional contact with said disk, and free for a limited rotatable movement thereon, a second disk, adjustable against and free from the adjoining side of said sprocket-wheel, whereby the latter may be clamped with more or less force between said disks, and a brake operated by the relative movement of the sprocket-wheel and hub, substantially as set forth.

8. A brake mechanism for bicycles, consisting of a wheel-hub mounted in fixed bearing in the frame, a sprocket-wheel mounted on the exterior of said hub and rotatably movable thereon, a brake element secured to said hub on the end thereof opposite said sprocket-wheel and rotating therewith, a stationary brake element in proximity to said rotating element, a member in the hub rotatable in a fixed plane, one end of which operatively engages said movable brake element, and the opposite end of which is operatively engaged, through the wall of said hub, by the sprocket-wheel, whereby the movement of the latter in opposite directions on said hub causes the engagement and disengagement of said rotatable and stationary brake elements, substantially as described.

JAMES H. BULLARD.

Witnesses:
WM. H. CHAPIN,
K. I. CLEMONS.